United States Patent
Briggs et al.

(10) Patent No.: US 9,378,010 B1
(45) Date of Patent: *Jun. 28, 2016

(54) CALCULATING CONFIDENCE VALUES FOR SOURCE CODE BASED ON AVAILABILITY OF EXPERTS

(71) Applicant: International Business Machines Corporation, Armonk, NY (US)

(72) Inventors: Simon A. S. Briggs, Winchester (GB); James K. Hook, Bristol (GB); Hamish C. Hunt, Ashford (GB); Nicholas K. Lincoln, Stockbridge (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,470

(22) Filed: Dec. 17, 2014

(51) Int. Cl.
*G06F 9/44* (2006.01)

(52) U.S. Cl.
CPC .................................... *G06F 8/70* (2013.01)

(58) Field of Classification Search
CPC ........... G06N 5/022; G06F 8/70; G06F 8/313; G06F 8/33
USPC ...................... 717/117; 706/45–47
See application file for complete search history.

(56) References Cited

U.S. PATENT DOCUMENTS

| | | | | |
|---|---|---|---|---|
| 5,630,125 | A * | 5/1997 | Zellweger | G06F 17/30994 |
| 2006/0070086 | A1 * | 3/2006 | Wang | G06Q 10/10 719/320 |
| 2007/0055564 | A1 * | 3/2007 | Fourman | G06Q 10/10 705/7.39 |
| 2007/0112720 | A1 * | 5/2007 | Cao | G06F 17/30684 |
| 2009/0138843 | A1 | 5/2009 | Hinton et al. | |
| 2009/0254538 | A1 | 10/2009 | Arthurs et al. | |
| 2012/0124559 | A1 * | 5/2012 | Kondur | G09B 7/02 717/125 |
| 2012/0191716 | A1 * | 7/2012 | Omoigui | H01L 27/1463 707/740 |
| 2014/0137072 | A1 | 5/2014 | Hey, Jr. et al. | |
| 2014/0201126 | A1 * | 7/2014 | Zadeh | G06K 9/627 706/52 |
| 2015/0170051 | A1 * | 6/2015 | Bufe, III | G06N 5/022 706/13 |

OTHER PUBLICATIONS

Foreign (GB) Patent Application No. 1414239.2, entitled "Functional Component History Tracking", filed Aug. 12, 2014.
U.S. Appl. No. 14/870,772, Entitled "Calculating Confidence Values for Source Code Based on Availability of Experts", filed Sep. 30, 2015.
Appendix P.: List of IBM Patents or Patent Applications Treated As Related, Dated Oct. 1, 2015, 2 pages.

* cited by examiner

*Primary Examiner* — Chameli Das
(74) *Attorney, Agent, or Firm* — William H. Hartwell (57) ABSTRACT

Software that uses machine logic to identify expert(s) for functional components of source code, determining a confidence value for each functional component based on the availability of its respective expert(s), by performing the following steps: (i) receiving a first functional component of a set of source code; (ii) receiving a set of knowledgeable person(s) information including identifying information for at least one person and respectively associated availability information for each identified person, where each person identified in the set of knowledgeable person(s) information has knowledge of the first functional component; and (iii) calculating, based, at least in part, on the identified person(s) and their respectively associated availability information, a confidence value for the first functional component relating to the availability of person(s) with knowledge of the first functional component.

4 Claims, 3 Drawing Sheets

| KNOWLEDGEABLE PERSONS | KNOWLEDGE SCORE(KS) | ADJUSTED KS |
|---|---|---|
| PERSON A | 8 | 7 |
| PERSON B | 9 | 2 |
| PERSON C | 1 | 1 |
| CONFIDENCE VALUE | | 10 |

CALCULATING CONFIDENCE VALUES FOR SOURCE CODE BASED ON AVAILABILITY OF EXPERTS

BACKGROUND OF THE INVENTION

The present invention relates generally to the field of source code management, and more particularly to source code version control and ownership management.

Generally speaking, computer software source code is any collection of computer instructions written using a human-readable computer language. Source code can be organized in a wide variety of ways, including, for example, by "functions." Typically, the term "function" refers to a sequence of computer instructions adapted to perform a specific task (and is sometimes also referred to as a procedure, subroutine, routine, method, subprogram, and/or callable unit). As used herein, a function (also referred to as a "functional component") is any set of source code that has been grouped for a particular purpose (for additional examples, see the Definitions sub-section of the Detailed Description).

Version control is known. Version control is the management of changes to documents, computer programs, websites, and other collections of information. In computer software development, version control is the practice of tracking and providing control over changes to source code.

Version control software can be essential for the organization of large, multi-developer software development projects. With typical version control software, each code revision includes a timestamp and an identification of the person who made the change (the "owner" or "contributor"). As such, if a particular piece of code needs to be revised, explained, and/or understood, users are able to identify and contact the person who most recently changed the code.

SUMMARY

According to an aspect of the present invention, there is a method, computer program product and/or system that performs the following steps (not necessarily in the following order): (i) receiving a first functional component of a set of source code; (ii) receiving a set of knowledgeable person(s) information including identifying information for at least one person and respectively associated availability information for each identified person, where each person identified in the set of knowledgeable person(s) information has knowledge of the first functional component; and (iii) calculating, based, at least in part, on the identified person(s) and their respectively associated availability information, a confidence value for the first functional component relating to the availability of person(s) with knowledge of the first functional component.

DETAILED DESCRIPTION

When managing/maintaining source code, it becomes important to have readily available experts for each functional component of the code. Embodiments of the present invention use machine logic to identify expert(s) for functional components of source code, determining a confidence value for each functional component based on the availability of its respective expert(s). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
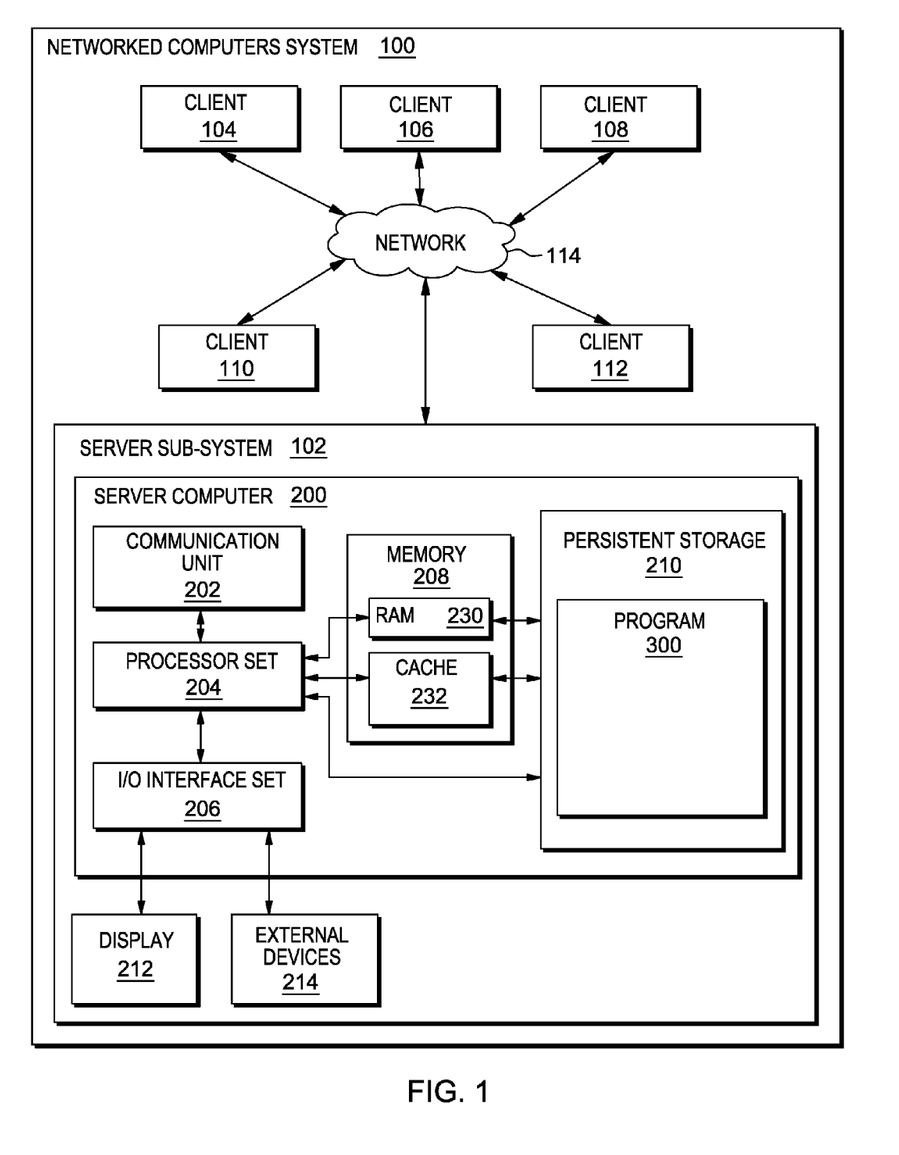
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: sub-system 102; client sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
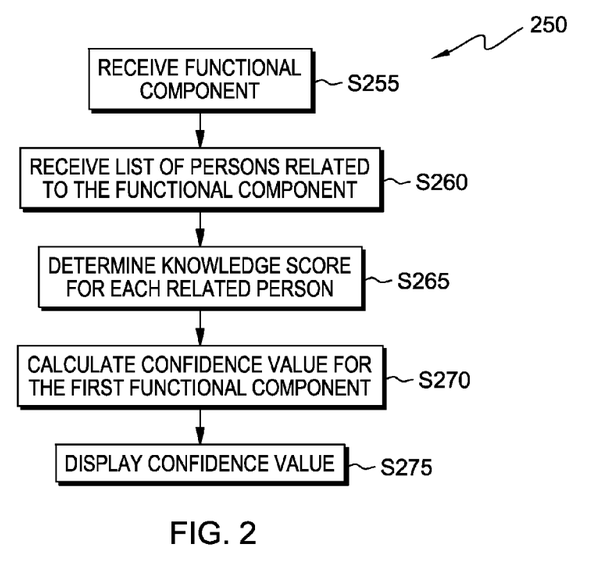
FIG. 2 is a flowchart showing a first embodiment method performed, at least in part, by the first embodiment system.
Figure 3:
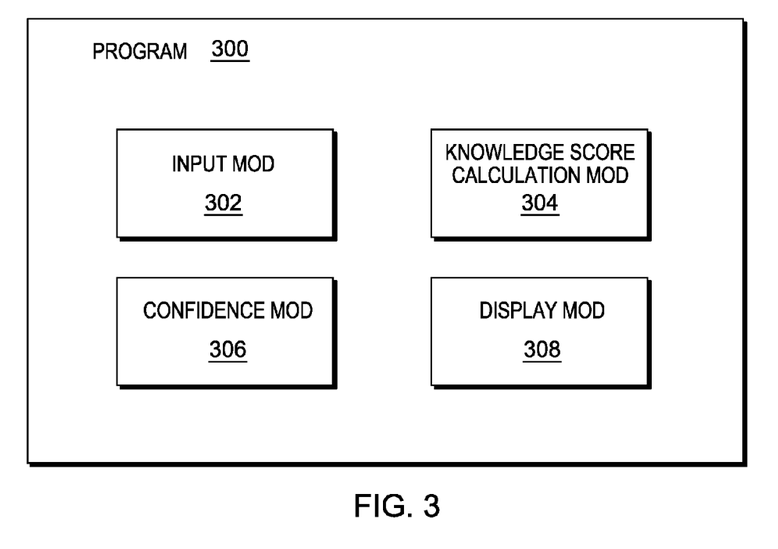
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Generally speaking, method 250 is adapted to identify knowledgeable persons (also referred to as "related persons" and/or "experts") for a functional component (also referred to as a "function" and/or a "component") of software to determine a confidence value (also referred to as a "confidence score") relating to the availability of knowledgeable persons of the functional component. Or, stated another way, embodiments of the present invention provide a confidence score for a functional component based on how easy or difficult it would be to find an "expert" for the functional component at any given time. This can be useful in identifying potential points of failure within a piece of software and help reduce the amount of work it may take to troubleshoot a problem in the software and/or perform a software upgrade.

Processing begins at step S255, where input mod 302 (see FIG. 3) receives a functional component (sometimes also referred to as the "first functional component" or the "present functional component") of a set of source code (for a definition of "functional component", see the Definitions sub-section of this Detailed Description). In the present example embodiment, which will be discussed throughout this sub-section, the functional component is a programming subroutine written using a known programming language. It should be noted that the present example embodiment is just one simplified example of an embodiment according to the present invention, and that typical embodiments may include additional amounts of detail and/or complication.

Processing proceeds to step S260, where input mod 302 receives a list (or set) of persons related to the functional component (also referred to as "related persons" and/or "knowledgeable persons"). Generally speaking, the related persons are persons who have knowledge (or may have knowledge) of the functional component such that they may be helpful or useful in answering questions about the functional component or otherwise providing information about the functional component. The list may be received automatically via version control software, via a database of users of the set of source code, and/or via other means. In other embodiments, program 300 may receive a raw list of potential related persons including, for example, a list of anyone who has ever used and/or contributed to the source code. In these embodiments, program 300 uses machine logic to reduce the list to a list of persons who are likely to have knowledge of the functional component. This reduction may be performed in a wide variety of ways, many of which are similar or identical to those discussed below in relation to determining knowledge scores (see discussion of step S265).

In some embodiments of the present invention, a person is included in the list of related persons if they are a contributor to the functional component or a frequent user of the functional component. Additionally, in some embodiments, a person is included in the list of related persons if they are a contributor and/or a frequent user of a second functional component that is related to the functional component in some way. Examples of ways that functional components can be related include: (i) if one component is the parent of the other functional component (that is, if one component calls or executes the other component (also referred to as the child component)); (ii) if the components contain similar source code; (iii) if the components are written in the same programming language; (iv) and/or if the source code of one of the components specifically refers to the other component. It should be noted that these similarities/examples of relatedness may also be used to determine knowledge scores (see the discussion of step S265, below).

Many embodiments of the present invention include availability information for each person included in the list of knowledgeable persons. Generally speaking, availability information is any information relating to when the respective person will or will not be available for consultation regarding the functional component. For example, availability information may include information regarding known vacation days for a given person. Alternatively, or additionally, availability information may include information regarding a given person's known work schedule. For additional examples of availability information, see the Definitions sub-section of this Detailed Description.

In the present example embodiment, in step S260, input mod 302 receives a list of three persons: (i) Person A, who was the last person to contribute to (and edit) the first functional component; (ii) Person B, who was the last person to contribute to a functional component similar to the first functional component (and who was also identified in the "comments" of the present functional component as an expert with regard to the present functional component); and (iii) Person C, who is an expert in the programming language that the first functional component is written in. Regarding availability information: (i) Person A is available during business hours (8:00 AM to 5:00 PM) in the Eastern Time zone, Monday through Friday, with sporadic meetings during the week (during which Person A will be unavailable); (ii) Person B is available during business hours in the Greenwich Mean Time zone, Monday through Friday, with an upcoming six month sabbatical (during which Person B will be unavailable); and (iii) Person C is available from 6:00 AM until 8:00 PM in the Eastern Time zone, seven days a week.

Processing continues to step S265 (see FIG. 2), where knowledge score calculation mod 304 (see FIG. 3) calculates a knowledge score for each related person, where the knowledge score corresponds to the respective person's knowledge of the functional component. The knowledge score can be calculated using a wide variety of methods. For example, in some embodiments, the knowledge score is calculated based on the person's "closeness" to the functional component. In these embodiments, the knowledge score is based on whether the person is a contributor and/or a user of a functional component that is "close" to the present functional component, with persons who are contributors/users of the present functional component itself having the highest knowledge score. For example, a person who is a user/contributor for a component that is a parent or child component of the functional component will have a lower score than a person who is a contributor/user of the functional component. Similarly, a person who is a user/contributor of a parent of a parent (or child of a child) of the functional component will have a correspondingly lower score than a person who is a user/contributor of a parent (or child) of the functional component. Furthermore, in some embodiments, a person who is a user/contributor of a component with similar source code to the functional component (but is not a parent or child of the functional component) may have a lower score (or sometimes, a higher score) than a person who is a user/contributor of a parent (or child) of the functional component.

Many other methods may be used to determine the knowledge score. For example, some embodiments consider the amount of time during which a person has been exposed to a particular functional component, or the amount of time that has passed since the user was last exposed to the functional component. In other embodiments, the knowledge score may be affected by whether other people have identified a person as an "expert" in the functional component (for example, by mentioning the person as an expert in the "comments" of the functional component's source code). In still other embodiments, program 300 may consult a skills bank or a known competencies database to determine whether a person is an expert (for example, by scanning the person's résumé).

The present example embodiment uses a simplified knowledge score where each person is assigned a number between 1 and 10, with 10 being the highest. It should be noted that this knowledge score system is being used for example purposes and that knowledge scores of the present invention may be much more complicated. Utilizing the simplified scoring system, program 300 determines the following knowledge scores: (i) a score of 8 for Person A (the last person to contribute to the code); (ii) a score of 9 for Person B (the identified "expert"); and (iii) a score of 1 for Person C (who is an expert in the programming language, but has no apparent familiarity with the present functional component).

Processing proceeds to step S270, where confidence mod 306 (see FIG. 3) determines a confidence value for the functional component, where the confidence value is related to the availability of persons with knowledge of the functional component. In the present embodiment, in determining the confidence value, mod 306 considers the knowledge score of each related person. However, this is not necessarily required. In some embodiments, for example, the confidence value is simply based on availability and does not consider levels of knowledge and/or expertise.

Embodiments of the present invention calculate confidence values (also referred to as "risk/recommendation fields") in a wide variety of ways. For example, many embodiments consider potential "down-time", measuring the amount (or percentage) of time where no knowledgeable person is available. In these embodiments, a high confidence value is generally given to a functional component that has available knowledgeable persons for close to 24 hours every day. The amount of availability is also typically balanced by the amount of expertise a given person has. For example, if a person is very available, but has a low knowledge score, that person isn't going to positively impact the confidence value as much as a highly available person with a high knowledge score would. Similarly, if a person with a high knowledge score is not very available, it will likely negatively impact the confidence value more than an unavailable person with a low knowledge score would. Furthermore, some embodiments of the present invention (such as those discussed in the Further Comments and/or Embodiments sub-section of this Detailed Description) include confidence value thresholds. In these embodiments, labels such as "good", "ok", and/or "bad" may be used to represent confidence values that fall within certain confidence value thresholds.

Figure 4:
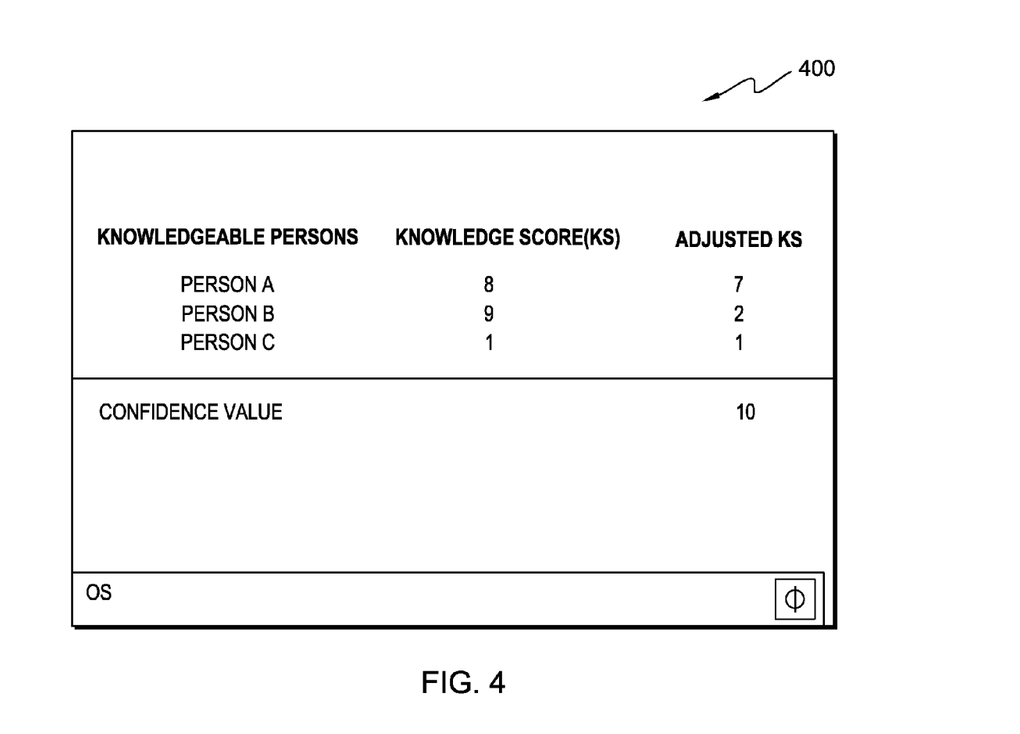
FIG. 4 is a screenshot view generated by the first embodiment system.

In the present example embodiment, the confidence value is determined by taking the knowledge score for each person, adjusting it based on that person's availability (thereby creating an "adjusted knowledge score"), and then adding the respective adjusted knowledge scores together. FIG. 4 shows screenshot 400 depicting the results of these calculations for the present example embodiment. As shown in FIG. 4, based on their respective availabilities: (i) Person A's knowledge score is adjusted from an 8 to a 7; (ii) Person B's knowledge score is adjusted from a 9 to a 2; and (iii) Person C's knowledge score remains a 1. As such, the confidence value for the functional component equals 10 (the result of adding the adjusted knowledge scores of 7, 2, and 1).

Processing proceeds to step S275, where display mod 308 displays the confidence value for a user. One example of this step is shown in screenshot 400 (see FIG. 4). Additionally, in many embodiments, method 250 may be repeated multiple times for multiple functional components. In these embodiments, step S275 may display a list of functional components along with their corresponding confidence values. That way, confidence values can be compared with each other in order to identify the functional components that are the most "at risk" of having no people available to support them. Also, in these embodiments, an additional confidence value (or values) may be generated for sets of functional components. For example, in one embodiment, a set of functional components (methods) are contained in a class. In this embodiment, an overall confidence value is assigned to the class based on the combined confidence values of each of the individual function components. This occurs automatically without the need for a user to perform a query on the system.

In the present example embodiment, the confidence value of 10 is presented to a user. Using this value, the user is able to decide whether to train additional people on the subject matter of the functional component in order to minimize the risk associated with the unavailability of experts for the functional component. In some embodiments, in fact, program 300 recommends, based on the confidence value, whether additional related persons should be added.

It should be noted that in many embodiments of the present invention, method 250 and program 300 are adapted to operate automatically (that is, without any user action). In these embodiments, confidence values for functional components are continually updated, in real time, in order to provide the best possible information to the user. If information regarding a functional component (such as its knowledgeable persons list) is updated, the functional component's confidence value will be updated accordingly. Additionally, the information (and correspondingly, the confidence values) for other, related functional components will also be updated automatically, in real time. For example, in one embodiment, program 300 constantly invokes method 250 for a large set of functional components. In this example, when a vacation entry for a known knowledgeable person is updated, the confidence value for each functional component related to the knowledgeable person is also updated. The updated confidence values then become immediately available for viewing by a user.

III. Further Comments and/or Embodiments

Some embodiments of the present invention recognize the following facts, potential problems and/or potential areas for improvement with respect to the current state of the art: (i) development team members and/or external parties may require quick advice on a particular set of code; (ii) existing code ownership platforms sometimes identify only a single "owner" of a set of code, leading to problems if the owner becomes unavailable for a period of time; and/or (iii) individuals who contribute code to a set of code may be limited in their understanding of all the functions within that set of code.

Some embodiments of the present invention may include one, or more, of the following features, characteristics and/or advantages: (i) analyzing a code base to identify experts for each function (and its related functions); (ii) identifying single ownership "bottlenecks"; (iii) warning users of at-risk code (for example, in relation to a code owner's upcoming unavailability); (iv) providing ownership/expertise information and availability metrics within function metadata; (v) providing clear expert rankings in context; (vi) identifying the best person to consult if a code owner is unavailable; (vii) identifying the need for training a "backup" expert on a given function; and/or (viii) determining the risk/importance of code functions based upon the availability of their authors and/or experts.

Some embodiments of the present invention track code version history according to functional components of the code (as opposed to tracking changes on a line-by-line basis). By tracking code version history by functional component, version tracking software of the present invention is able to do the following: (i) determine expertise in particular functions (and related expertise in similar functions); (ii) determine when a function is singularly owned; (iii) determine when a function is singularly owned and does not have any related functions; (iv) identify functions where a skills transfer to an additional individual may be necessary; and/or (v) report the total number/percentage of functions that are isolated or have sufficient multi-person knowledge of the code.

In some embodiments, when a particular piece of code has only one person that has actually changed the code, a history tracker can be used to determine other people who may have knowledge about the code. Examples of additional people who may have knowledge about the code include: (i) people who have copied the code; (ii) people who have modified the code; and/or (iii) people who have used the code elsewhere. Additionally, some version tracking software of the present invention is adapted to identify code that is similar to the present code. This allows the invention to identify people who have written/used similar code, and also provides the added benefit of being able to flag similar pieces of code for possible merger in the future.

As previously mentioned, some embodiments of the present invention utilize code organized by functional components. Typical fields associated with functional components in these embodiments include: (i) a component identifier; (ii) the "type" of the component (for example, a method, a class, or a function); (iii) references to methods (if any) from which the component is derived; and (iv) a change set history of the unstructured content within the component. However, in some embodiments of the present invention, version tracking software adds the following additional fields of data for each functional component (when applicable): (i) for each change set in the change set history, the identification of the person who made the change; (ii) for each change set in the change set history, a manually editable skills transfer list of persons who have been provided a working knowledge of the change; (iii) associate skill relationships from derived functions; and/or (iv) an overall risk/recommendation field.

The associated skill relationships from derived functions (see (iii) in the preceding paragraph) help to identify additional persons who may have knowledge of a particular functional component (with varying levels of "expertise"). Generally speaking, individuals who have written/used code for a parent component or a child component of a particular functional component have exposure to code that is likely similar to the code of the functional component (for example, a general API function that has been applied to a specific scenario). Similarly, individuals who have previously made changes to the functional component have written code that is likely similar (or at least accomplishes similar goals) to the current code in the functional component.

In one embodiment of the present invention, the associated skill relationships for a particular functional component are generated according to the following metrics: (i) all previous change set submitters for the functional component are assigned expertise with the functional component; (ii) all previous submitters of parent components (from which the functional component is derived) are assigned associative expertise with the functional component; (iii) all previous submitters of child components (derived from the functional component) are assigned associative expertise with the functional component; and (iv) all previous submitters to child components derived from the parent of the functional component are assigned possible associative expertise with the functional component.

Furthermore, if there is any evidence that suggests that a person is no longer available (due to, for example, holidays, extended leave, retirement, relocation to a new department, or leaving the company), that person is assigned as having deprecated expertise. Information regarding availability may be obtained via a data repository holding calendar and/or employment information.

As mentioned above, some embodiments of the present invention generate an overall risk/recommendation field for each functional component. Generally speaking, this field represents the amount of risk that no persons with knowledge of the particular functional component will be able to be reached at a given time.

In one embodiment of the present invention, the risk/recommendation field is generated according to the following metrics: (i) functional components with non-deprecated skills transfer lists with at least one person are assigned a "good" status; (ii) functional components assigned non-deprecated expertise are assigned a "good" status; (iii) functional components assigned near-deprecated expertise are assigned a "good, potential action required" status, with an optional report indicating the expected time during which the expert will be unavailable; (iv) functional components assigned non-deprecated associative expertise are assigned a "good, verify" status, with an optional report suggesting an investigation into the associative relationship; (v) functional components assigned near-deprecated associative expertise are assigned a "good, potential action required" status, with an optional report indicating the expected time during which the expert will be unavailable; (vi) functional components assigned non/near-deprecated possible associative expertise are assigned a "warning" status, with an optional report suggesting an investigation into the associative relationship and potentially adding to the skills transfer list; (vii) functional components with a non-deprecated owner and no associative relationships are assigned a "warning" status and a skills transfer session is recommended; (viii) functional components with a near-deprecated owner and no associative relationships are assigned an "action required" status and a skills transfer session is recommended; (ix) functional components with a deprecated owner and no associative relationships are assigned an "action required" status and an urgent investigation into the code is recommended; and (x) functional components with multiple recommended experts are assigned a "potential merge" flag.

In some embodiments, an overall product report is generated, providing a percentage breakdown of all functional components and their status as "good", "warning", and/or "action required". This provides an overall view of how well expertise can be provided across an entire code base and how resistant the code base is to single points of failure.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Functional component: any set of source code that has been grouped for a particular purpose, including, but not limited to: functions, procedures, subroutines, routines, methods, subprograms, callable units, one or more consecutive lines of code, one or more nonconsecutive lines of code, code organized by author/contributor, code adapted to perform a specific task or set of tasks, and/or non-functional code (for example, comment code).

Availability information: any information relating to the availability of a given person, including but not limited to: (i) amount-related information, such as whether a person will be fully available, fully unavailable, and/or partially available/unavailable; (ii) time-related information, such as whether the person will be unavailable for a particular calendar event, at a certain time every week/month/year, and/or for a particular duration; and/or (iii) type-related information, such as whether the person is available in person, via phone, via videoconference, and/or via a computer terminal.

What is claimed is:

1. A computer program product comprising a computer readable storage medium having stored thereon:
   first program instructions programmed to receive a first functional component of a set of source code;
   second program instructions programmed to receive a set of knowledgeable person(s) information including identifying information for at least one person and respectively associated availability information for each identified person, where each person identified in the set of knowledgeable person(s) information has knowledge of the first functional component;
   third program instructions programmed to calculate, based, at least in part, on the identified person(s) and their respectively associated availability information, a confidence value for the first functional component relating to the availability of person(s) with knowledge of the first functional component; and
   fourth program instructions programmed to determine, for each identified person, a knowledge score corresponding to the respective person's knowledge of the first functional component;
   wherein:
   the calculating of the confidence value for the first functional component is further based, at least in part, on the respective knowledge score for each identified person;
   each person identified in the set of knowledgeable person(s) is at least one of the following: a contributor to the first functional component; a frequent user of the first functional component; a contributor to a second functional component of the set of source code, where the second functional component is a parent component and/or a child component of the first functional component; a frequent user of the second functional component; a contributor to a third functional component of the set of source code, where the third functional component includes similar source code to the source code included in the first functional component but is not a parent or child component of the first functional component or the second functional component; and/or a frequent user of the third functional component;

the determined knowledge score for an identified person is higher when the respective person is a contributor and/or a user of the first functional component than when the respective person is a contributor and/or a user of the second functional component; and the determined knowledge score for an identified person is higher when the respective person is a contributor and/or a user of the second functional component than when the respective person is a contributor and/or a user of the third functional component.

2. The computer program product of claim 1, further comprising:
fourth program instructions programmed to recommend, based, at least in part, on the confidence value, that additional person(s) with knowledge of the first functional component should be added to the set of knowledgeable person(s).

3. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive a first functional component of a set of source code;
second program instructions programmed to receive a set of knowledgeable person(s) information including identifying information for at least one person and respectively associated availability information for each identified person, where each person identified in the set of knowledgeable person(s) information has knowledge of the first functional component;
third program instructions programmed to calculate, based, at least in part, on the identified person(s) and their respectively associated availability information, a confidence value for the first functional component relating to the availability of person(s) with knowledge of the first functional component; and
fourth program instructions programmed to determine, for each identified person, a knowledge score corresponding to the respective person's knowledge of the first functional component;

wherein:
the calculating of the confidence value for the first functional component is further based, at least in part, on the respective knowledge score for each identified person;
each person identified in the set of knowledgeable person(s) is at least one of the following: a contributor to the first functional component; a frequent user of the first functional component; a contributor to a second functional component of the set of source code, where the second functional component is a parent component and/or a child component of the first functional component; a frequent user of the second functional component; a contributor to a third functional component of the set of source code, where the third functional component includes similar source code to the source code included in the first functional component but is not a parent or child component of the first functional component or the second functional component; and/or a frequent user of the third functional component;

the determined knowledge score for an identified person is higher when the respective person is a contributor and/or a user of the first functional component than when the respective person is a contributor and/or a user of the second functional component; and the determined knowledge score for an identified person is higher when the respective person is a contributor and/or a user of the second functional component than when the respective person is a contributor and/or a user of the third functional component.

4. The computer system of claim 3, further comprising:
fourth program instructions programmed to recommend, based, at least in part, on the confidence value, that additional person(s) with knowledge of the first functional component should be added to the set of knowledgeable person(s).

* * * * *